(12) United States Patent
Sanchez et al.

(10) Patent No.: US 10,820,753 B2
(45) Date of Patent: Nov. 3, 2020

(54) NATURAL MATERIAL GRINDING AND CUTTING DEVICE

(71) Applicants: Erick Sanchez, Oakland, CA (US); Adam Pressler-Smith, Oakley, CA (US)

(72) Inventors: Erick Sanchez, Oakland, CA (US); Adam Pressler-Smith, Oakley, CA (US)

(*) Notice: Subject to any disclaimer, the term of this patent is extended or adjusted under 35 U.S.C. 154(b) by 141 days.

(21) Appl. No.: 15/787,681

(22) Filed: Oct. 18, 2017

(65) Prior Publication Data
US 2019/0110644 A1 Apr. 18, 2019

(51) Int. Cl.
| A47J 42/24 | (2006.01) |
| B02C 18/08 | (2006.01) |
| B02C 23/10 | (2006.01) |
| B02C 18/18 | (2006.01) |
| A47J 42/34 | (2006.01) |

(52) U.S. Cl.
CPC ............ *A47J 42/24* (2013.01); *A47J 42/34* (2013.01); *B02C 18/08* (2013.01); *B02C 18/18* (2013.01); *B02C 23/10* (2013.01)

(58) Field of Classification Search
CPC .. A47J 43/25; A47J 42/32; A47J 42/34; A47J 42/00; A47J 42/42; A47J 43/28; A47J 43/284; B02C 18/18; B02C 23/10; B02C 18/08; B02C 21/02; A24B 3/06; A24B 3/07; A24B 7/00
USPC .............................................. 241/168–169.2
See application file for complete search history.

(56) References Cited

U.S. PATENT DOCUMENTS

| 4,887,755 A * | 12/1989 | Gibilisco ............. A61J 7/0007 225/103 |
| 5,038,475 A * | 8/1991 | Wolff .................... A61J 7/0007 225/103 |
| 5,118,021 A * | 6/1992 | Fiocchi ................ A61J 7/0007 225/103 |
| 7,243,826 B2 * | 7/2007 | Darst .................... A61J 7/0007 225/103 |
| 7,252,254 B1 * | 8/2007 | Engel ................... A61J 7/0007 241/168 |
| 7,422,170 B2 * | 9/2008 | Bao ......................... B02C 18/24 241/168 |

(Continued)

FOREIGN PATENT DOCUMENTS

CA 2960111 A1 * 9/2017 ............... A63C 1/02

*Primary Examiner* — Faye Francis
(74) *Attorney, Agent, or Firm* — Mark A. Goodman, Esq.

(57) ABSTRACT

A natural material grinding and cutting device provides a tool for processing natural materials. One portion of the tool is used to slice materials into strips and another portion of the tool is used to process materials into mulch or fine particulate. A two piece embodiment of the device includes a top structure rotatably coupled to a bottom structure. The underside of the top structure and the topside of the bottom structure include open faced chambers for disposing a set of cutting projections or teeth. When the top structure joins to the bottom structure, the open faced chambers combine to form a grinding chamber for grinding natural materials. The bottom structure further includes a cutting portion comprising a cutting chamber, a blade, and a base. In some examples, the blade is removably disposed a slot located in the lower middle portion of the cutting chamber.

16 Claims, 4 Drawing Sheets

(56) References Cited

U.S. PATENT DOCUMENTS

| | | | |
|---|---|---|---|
| 8,590,164 B2 * | 11/2013 | Noble | A61J 7/0007 30/124 |
| D702,398 S * | 4/2014 | Fakhouri | D27/181 |
| 8,720,808 B2 * | 5/2014 | Young | A61J 7/0007 241/169.2 |
| 9,505,009 B1 * | 11/2016 | Wein | B02C 18/186 |
| RE46,408 E * | 5/2017 | Hainbach | A47J 42/14 |
| 9,635,884 B2 * | 5/2017 | Shalom | A47J 42/34 |
| 9,681,777 B1 * | 6/2017 | Dukat | B02C 18/18 |
| 9,730,554 B2 * | 8/2017 | Chan | B02C 18/08 |
| 9,737,092 B2 * | 8/2017 | Grumbacher | A24C 5/40 |
| 9,757,733 B1 * | 9/2017 | Dukat | A47J 42/40 |
| 9,873,125 B1 * | 1/2018 | LaGuardia, Jr. | A24F 13/00 |
| 10,028,527 B2 * | 7/2018 | Jordan | A24F 7/04 |
| 10,039,418 B2 * | 8/2018 | Staiano | A47J 42/00 |
| 10,194,688 B2 * | 2/2019 | Roberto, Jr. | A61J 7/0076 |
| 10,342,257 B2 * | 7/2019 | Zeitlin | A24F 9/02 |
| 10,478,825 B2 * | 11/2019 | Mroue | B02C 18/10 |
| 10,602,881 B2 * | 3/2020 | Gumbel | A47J 42/14 |
| 10,617,259 B2 * | 4/2020 | Staiano | B02C 23/10 |
| 2004/0149142 A1 * | 8/2004 | Groll | A47J 36/02 99/426 |
| 2006/0201985 A1 * | 9/2006 | Sze | A61J 7/0007 225/104 |
| 2007/0164141 A1 * | 7/2007 | Engel | A61J 7/0007 241/169.2 |
| 2010/0065074 A1 * | 3/2010 | Lee | A44B 15/00 131/253 |
| 2012/0168544 A1 * | 7/2012 | Chaoui | B02C 18/08 241/68 |
| 2012/0272528 A1 * | 11/2012 | Li | B25F 1/00 30/124 |
| 2013/0015278 A1 * | 1/2013 | Edwards | A47J 42/40 241/69 |
| 2016/0095473 A1 * | 4/2016 | Perucca | A47J 42/24 241/100 |
| 2017/0035106 A1 * | 2/2017 | Spurling, III | A24F 13/24 |

* cited by examiner

NATURAL MATERIAL GRINDING AND CUTTING DEVICE

TECHNICAL FIELD

In general, the present disclosure relates to functional devices for grinding and cutting natural materials. In particular, multi-function grinding and cutting devices for preparing herbs, spices, barks, animal products, minerals and other natural materials for medicinal and food applications are described herein.

BACKGROUND

Grinders, presses, grates, and other devices are commonly used for rendering herbs, spices, barks, and other plant materials to mulch or particulate form. Processed plant materials are frequently incorporated into foods and medicines. Fine pieces of herbs, spices, minerals, truffles, fungi, and animal products, for example, eggs, can be incorporated into foods as a garnish, topping, or additional flavor element. Ingredients for soups as well as sauces, glazes, dressings, rubs, salsas, relishes, and other condiments are also frequently ground to maximize the surface area of the ingredient exposed to heat during cooking or taste buds during eating. Some expensive or potent ingredients must be ground into fine pieces before serving to control costs and prevent the taste of one ingredient from over powering a dish.

Cutting and slicing are other common ways of processing plants and other natural materials while cooking. Some ingredients, for example, celery stalks, potatoes, and carrots need to be chopped, skinned, or pealed before being cooked. Additionally, making foods wrapped in plant products, for example, tamales wrapped in banana leaves, cooked fish wrapped in bay leaves, or sushi wrapped in seaweed, requires slicing the wrapping material before incorporating the other ingredients. Preparing many foods requires both grinding and cutting ingredients, therefore, it would be useful to have one device that can be used to cut and grind natural materials including plants, fungi, minerals and animal products.

Medicinal applications for grinding and cutting natural materials are also well established. Ancient Egyptian and Ingenious Native American and African cultures first discovered the healing effects of some natural materials more than five thousand years ago. Today herbal medicine persists as an essential component of the world's oldest medical tradition, Traditional Chinese Medicine (TCM). In TCM, each herbal medicine or medicinal is prepared according to a prescription given by a TCM physician. Preparing medicinals from these prescriptions frequently involves grinding natural materials into a mulch or fine particulate. Increasing the surface area of the natural materials is necessary because TCM medicines are prepared by decoction, a method of extraction that involves boiling natural materials to dissolve the chemicals in the material. The more surface area of the natural material in contact with the solvent during decoction, the more efficient the chemical extraction.

Independent of TCM medicinals, over the counter herbal supplements are a multibillion-dollar industry. The well documented therapeutic effects of many herbs including Echinacea, Ginkgo, and Ginseng combined with lighter regulation in the US relative to pharmaceutical drugs makes herbal supplements an attractive business opportunity. Serious side effects of some western pharmaceuticals further drive demand for alternative herbal-based treatments for a variety of conditions. Most herbal supplements sold today are consumed in pill form or as a tea or tonic.

Regardless of the method of consumption, the herbs must be processed before being consumed as a medicine. Once harvested and dried, some herbs require separating out steams, leaves, and other plant components that contain active chemical ingredients from non-functional components. Larger pieces of the active plant components are then cut into small pieces before being steeped in water to make a tea or tonic. To prepare supplements in pill form, herb cuttings are ground into a fine powder, combined with other herbs, and compressed into a tablet or packed into a capsule.

Most pill form herbal supplements are currently packed in large factories using heavy machinery. This model leads to medicines distributed in standard doses that produce therapeutic effects in some or most clinical test patients. Standard doses, however, are not designed to achieve optimal therapeutic effects on all patients. To promote a more individualized approach to herbal medicines, hand tools that make processing herbs easier are needed. Providing proper tools for processing herbs and other natural materials along with personalized knowledge of one's immune system would increase the effectiveness of herbal remedies particularly in cases where an individual does not respond well to standard doses of medication.

SUMMARY OF INVENTION

The current invention provides a grinding and cutting device for processing natural materials. Methods of using the device to process natural materials including botanicals, fungi, animal products, and minerals are also included in the current invention.

In one embodiment, the grinding and cutting device comprises two cylindrical components. The two-piece example includes a top structure and a bottom structure. The top structure comprises a first chamber, a top surface, and a first plurality of teeth extending from the inner surface of the top structure within the first chamber. The bottom structure is rotatably coupled to the top structure and comprises a second chamber facing the first chamber, a floor surface, a second plurality of teeth extending from the floor surface of the bottom structure within the second chamber, and a cutting structure coupled to the underside of the floor surface. When coupled to the top structure, the second chamber in the bottom structure combines with the first chamber to create a grinding chamber. The grinding chamber houses the first and second pluralities of teeth and is where natural materials are ground in the grinding and cutting device.

The cutting structure comprises a cylindrical cutting chamber with at least two openings on opposite sides of the cutting structure, a blade mounted inside the cutting chamber and set back from the chamber openings to ensure objects must be inserted into the cutting chamber to contact the blade, and base with a flat bottom surface. In some embodiments, the blade sits in a slot toward the middle of the cutting chamber. Optionally, the blade is removable. In examples with removable blades, the slot may have one or more pegs and/or rotatable clasps for securing the blade within the slot. In this example, the area of the base beneath the blade is hollow so that the underside of the slot is accessible. To remove the blade from the slot, a clasp covering the lower portion of the blade that is disposed in the slot is rotated through the underside of the slot into the hollow base area. The blade is then removed from one or more pegs extending away from at least one side wall of the slot. The unimpaled blade is then extracted from the slot through either the top or underside. In one embodiment the underside of the base is removable by rotating or sliding. In other examples, the underside of the base is left open with the hollow base area beneath the blade exposed.

In this example, the first and second pluralities of teeth are small diamond shaped projections extending out from the inner surface of the top structure and the floor surface of the bottom structure within the first and second chambers. The second plurality of teeth includes two concentric sets of smaller teeth oriented around a large tooth positioned at the center of the floor surface. In this arrangement, the smaller teeth are rotated thirty to ninety degrees counter-clockwise from the central vertical axis of the large tooth.

The first plurality of teeth includes two concentric sets of teeth oriented around a central opening in the inner surface. In this example, teeth in the inner concentric set are smaller and less numerous than teeth in the outer concentric set. Teeth in both concentric sets are rotated thirty to ninety degrees counter clockwise from the central vertical axis of the opening at the center of the inner surface.

In this embodiment, the first and second pluralities of teeth are arranged so that the two concentric sets of teeth on the top structure fall in between the two concentric sets of teeth on the bottom structure when the top and bottom structures are coupled. In particular, the inner concentric set of teeth on the top structure falls between the large central tooth and the inner concentric set on the bottom structure. Similarity, the outer concentric set of teeth on the top structure falls between the inner and outer concentric sets on the top structure. The first and second pluralities of teeth are rotated thirty to ninety degrees counter clockwise from the central vertical axis to reduce the opening between teeth when the top structure is coupled to the bottom structure and rotated. To allow the top structure to rotate freely when coupled to the bottom structure, the first and second pluralities of teeth are precisely arranged and rotated so that no tooth in the first plurality overlaps with a tooth in the second plurality. This particular geometry creates a narrow gap between every tooth at every degree of rotation when top and bottom structured couple together with the first and second pluralities of teeth combined within a grinding chamber. By providing a grinding chamber with narrow gaps between every tooth and no overlap of tooth edges, this arrangement of teeth allows material placed in the first and second chambers to be ground into a mulch or fine particulate without snagging or otherwise restricting rotation of the top structure within the bottom structure.

Other embodiments of the grinding and cutting device included in this invention have alternative teeth structure and arrangements. For example, the teeth may be triangular, square, circular arched, half circular, or any other multisided shape. Teeth are also arranged in a variety of concentric patterns. These concentric patterns comprise two or more concentric sets or different shapes, for example, concentric rings, squares, diamonds, triangles, and other polygons, including be arranged in a diagonal line, diamond, concentric square, tilted square within a concentric square, or other geometric pattern. Additionally, one grinding and cutting device may include three or more different sizes of teeth and two or more shapes and/or arrangements of teeth on at least one of the top structure or the bottom structure.

In another embodiment, the grinding and cutting device comprises four cylindrical components. The four-piece variation includes a top structure, a middle grinding structure, a cutting and collection structure, and a bottom fine collection structure. The top structure comprises a first chamber, a top surface, and a first plurality of teeth extending from the inner surface of the top structure within the first chamber.

The middle grinding structure is rotatably coupled to the top structure and comprises a second chamber facing the first chamber, a permeable floor surface, and a second plurality of teeth extending from the floor surface within the second chamber. When combined with the top structure, the second chamber of the grinding structure combines with the first chamber to form a grinding chamber where both pluralities of teeth are disposed. The cutting and collection structure couples to the middle grinding section and comprises a cutting section and collection section. The collection section includes a third chamber for storing pieces of natural materials ground in top and middle grinding structures. The collection section further includes a sieve comprising a fine mesh for separating mulched chucks of ground natural materials from finer powder and dust particles. The cutting section is mounted to the underside of the collection section and comprises a cylindrical cutting chamber with at least two openings on opposite sides of the cutting structure, a blade mounted inside the cutting chamber and set back from the chamber openings to ensure objects must be inserted into the cutting chamber to contact the blade, and a base with a flat bottom surface.

In some embodiments, the cutting section further comprises a slot for disposing the blade. In one example the slot is toward the middle of the cutting chamber. Optionally, the blade is removable from the slot. In examples with removable blades, the slot may have one or more pegs and/or rotatable clasps for securing the blade within the slot. In this example, the area of the base beneath the blade is hollow so that the underside of the slot is accessible. To remove the blade from the slot, a clasp covering the lower portion of the blade that is disposed in the slot is rotated through the underside of the slot into the hollow base area. The blade is then removed from one or more pegs extending away from at least one side wall of the slot. The unimpaled blade is then extracted from the slot through either the top or underside. In one embodiment the underside of the base is removable by rotating or sliding. In other examples, the underside of the base is left open with the hollow base area beneath the blade exposed.

The bottom fine collection structure is coupled to the grinding and collection structure and includes a fourth chamber for storing fine powder and dust particles produced from grinding natural materials in the upper structures.

In this example, the first and second pluralities of teeth are diamond shaped and arranged in a concentric circle pattern comprising two concentric rings. Similar to the two piece variation, first plurality of teeth falls between the second plurality of teeth when the top structure rotatably couples to the middle grinding structure and forms the grinding chamber. This arrangement of the first and second pluralities of teeth creates a narrow gap between teeth extending out from the inner surface of the top structure and teeth extending out from the floor surface of the middle grinding structure. The narrow gap between teeth is maintained at every degree of rotation of the top structure within the middle grinding structure to ensure no two teeth overlap. This particular geometry allows the top structure to rotate while sitting inside the middle grinding structure without snagging.

To grind natural materials using the two-piece or the four piece variation, a piece of natural material, for example, an herb, fungi, or soft mineral is placed in between the first plurality of teeth extending out from the top section. In the two-piece variation, the top structure is then rotatably coupled to the bottom structure with the first chamber of the top structure facing the second chamber of the bottom structure to form the grinding chamber. When coupled in this orientation, the first and second plurality of teeth dig into and pierce the material disposed in the grinding chamber. Rotating the top structure pulls the material apart by placing larger chucks of material in contact with one or more pairs of teeth separated by a narrow gap. Rotating the top structure for a series of full, half, or quarter clockwise and/or counter clockwise rotations quickly grinds the material reducing it to a mulch or fine particulate material. A reduction in the force required to rotate the top structure indicates that the material has been completely ground to a mulch or fine particulate.

In the two-piece variation, ground materials sit on the floor surface of the bottom structure. The smaller pieces of material can be extracted from the grinding and cutting device by decoupling the top and bottom structures to open the grinding chamber and turning over the first and second chambers to dump out the material.

To grind natural materials in the four-piece variation, the top structure rotatably couples to the middle grinding structure with the first chamber of the top structure facing the second chamber of the middle grinding structure to form the grinding chamber. When coupled in this orientation, the first and second plurality of teeth dig into and pierce the material disposed in the grinding chamber. Rotating the top structure pulls the material apart by placing large chucks of material in contact with one or more pairs of teeth separated by a narrow gap. Rotating the top structure for a series of full, half, or quarter clockwise and counter clockwise rotations continuously funnels large chucks of material into the narrow gaps between teeth until the material is sufficiently ground into small pieces. A reduction in the force required to rotate the top structure indicates that the material has been complete ground to a mulch or fine particulate.

In the four-piece variation, ground materials pass through a plurality of holes in the floor surface of the middle grinding structure. Materials passing through the plurality of holes are collected in the collection section of the collection and cutting structure. Once in the collection section, ground mulch is separated from powder and dust particles by the mesh sieve at the bottom of the collection section. Powder and dust particles small enough to pass through the sieve also pass through the cutting section and are collected in the fine collection structure. Alternatively, the fine collection structure may be mounted above the cutting section of the cutting and collection structure so that powder and dust particles that pass through the mesh sieve are collected in the fine collection structure without passing through the cutting section.

To remove ground particles from the four-piece variation, the collection and cutting structure is decoupled from the top and middle grinding structures. Mulch and fine particles too large to pass through the mesh sieve are contained in the collection section and can be dumped out of the collection chamber. Fine powder and dust particles small enough to pass through the mesh sieve are collected by decoupling the fine collection structure from the collection and cutting structure and dumping out the fine collection chamber. In some instances, not all ground natural material mulch and fine particles will pass through the holes on the floor surface of the middle grinding structure. These materials can be removed by decoupling the top structure from the middle grinding structure to open the grinding chamber then dumping out each structure.

DETAILED DESCRIPTION OF THE PREFERRED EMBODIMENTS

Figure 1:
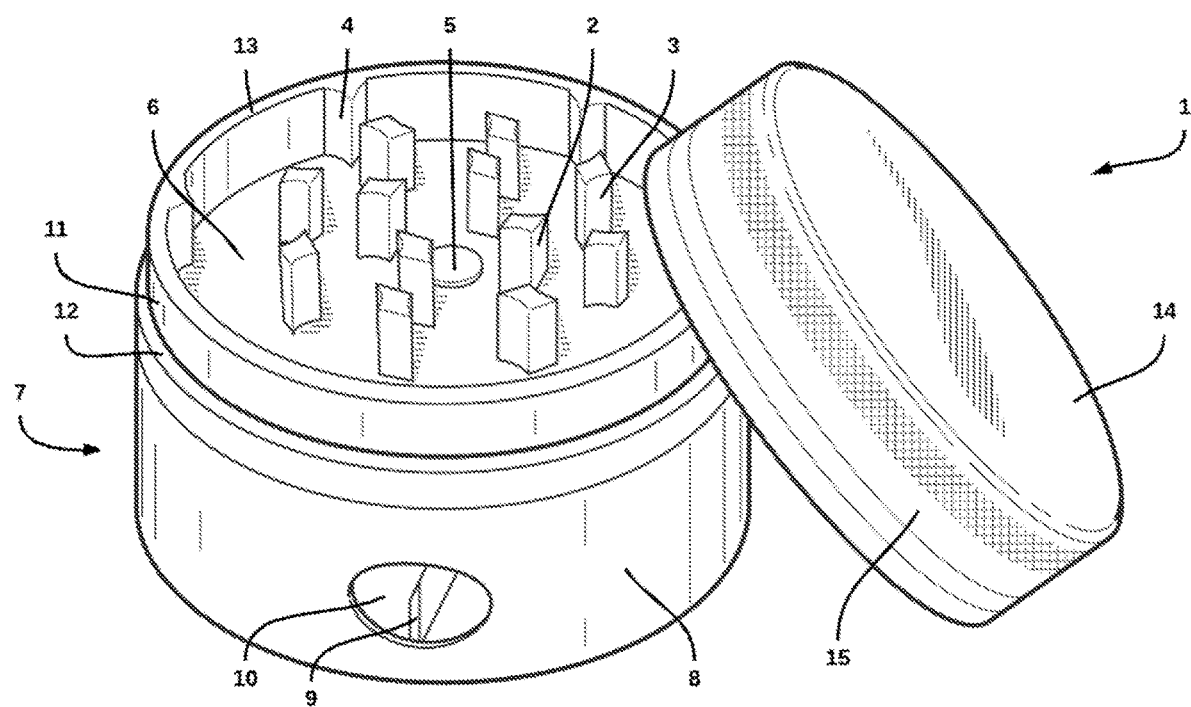
FIG. 1 illustrates a perspective view of a two-piece embodiment of the cutting and grinding device.
Figure 3:
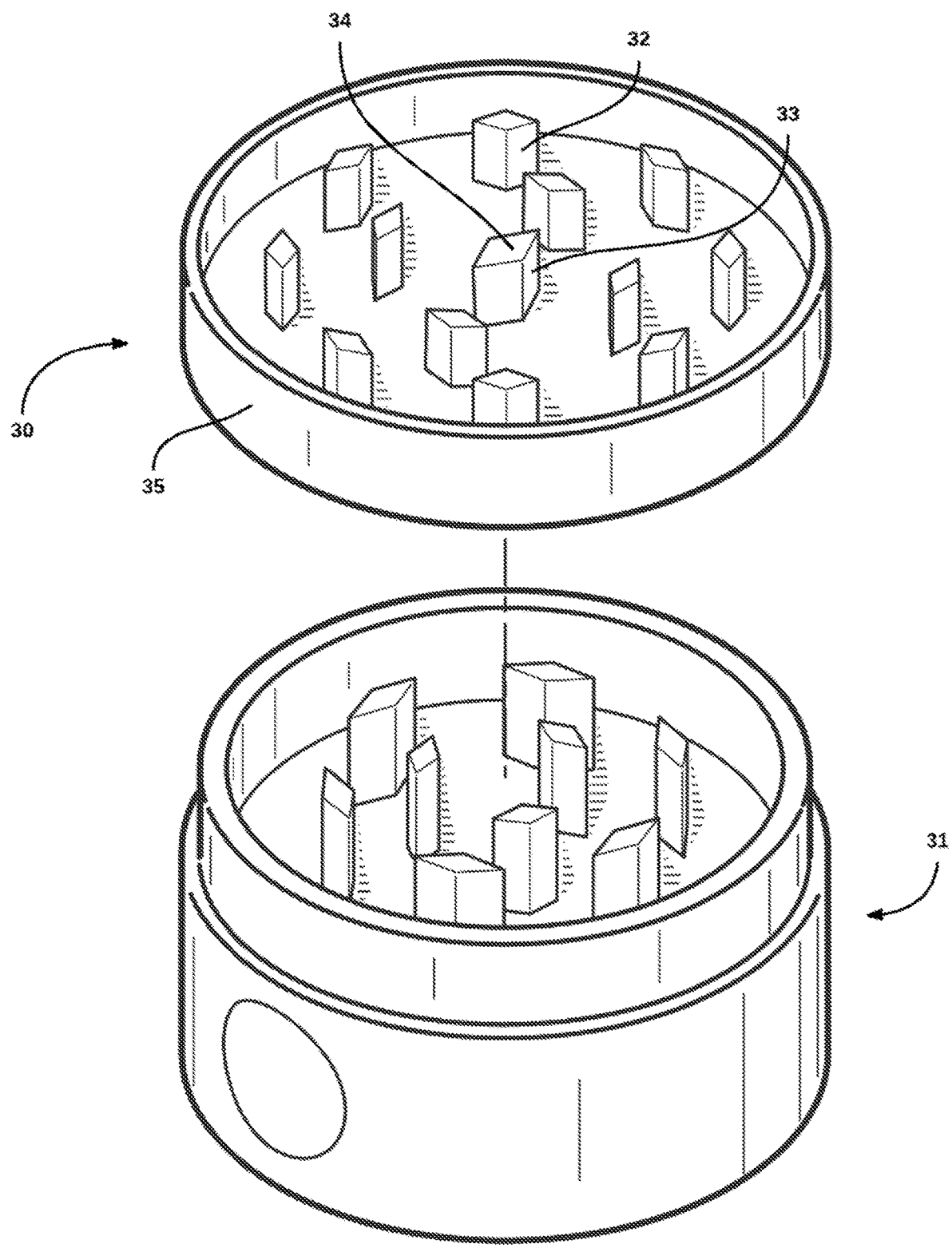
FIG. 3 illustrates an alternative perspective view of a two-piece embodiment of the cutting and grinding device. This view shows a perspective bottom view of the top structure in this example.

FIG. 1 illustrates one two-piece embodiment of the cutting and grinding device described herein. This example includes a top structure 1 and a bottom structure 7. The top structure includes a first plurality of teeth for grinding natural materials. As shown in FIG. 3, first plurality of teeth 32 extend out from the underside of the top structure within a first grinding chamber. In one example, the first plurality of teeth are arranged in a concentric pattern comprising two concentric rings of teeth surrounding a central tooth 33. The central tooth 33 is optionally enlarged and may include a magnet attached to the bottom surface 34 of the tooth. The first plurality of teeth are contained within a grinding chamber is defined by a cylindrical outer wall 35.

The top structure 1 rotatably couples to a bottom structure 7 by fitting over and around a recessed outer wall 11 boarding a second grinding chamber on the upper portion of the bottom structure 7. When the top and bottom structures 1,7 are coupled together, the top structure rests on a shelf 12 just below the recessed portion 11. The shelf 12 helps hold the top structure 1 in place within the bottom structure 7 to ensure a level path of rotation for the first plurality of teeth on the underside of the top structure 1. Additionally, combining the top and bottom structures 1, 7 with the first grinding chamber on the top structure 1 facing the second grinding chamber on the bottom structure 7, results in the magnet on bottom of the central tooth coupling to a second magnet 5 on the floor surface 6 of the second grinding chamber in the bottom structure 7. The attractive force between the two magnets helps holds the top structure 1 in place so that when rotated during grinding the top structure 1 stays aligned with—and does not decouple from—the bottom structure 7, thereby ensuring proper alignment of teeth within the grinding chamber.

The bottom structure 7 comprises an upper grinding portion and a base 8 including a cutting portion. The upper grinding portion is defined by the cylindrical recessed outer wall 11 set a narrow distance in from the outer edge of the base 8. The upper grinding portion includes a second plurality of teeth 2, 3 and a plurality of triangular points 4 extending out from the floor surface 6 and inner surface of the recessed outer wall 11 within the second grinding chamber. In this example, the second plurality of teeth 2, 3 are arranged in a ring pattern comprising two concentric rings surrounding the magnet 5 on the floor surface 6. The ring pattern of the second plurality of teeth 2, 3 and the arrangement of triangular points 4 is complementary to the ring pattern of the first plurality of teeth so that the inner concentric ring of second plurality of teeth 2, 3 fits around the central tooth 33, the inner concentric ring of the first plurality of teeth sits in between the inner and outer concentric rings on the second plurality of teeth 2, 3, and the outer concentric ring of the first plurality if teeth sits in between the outer concentric ring on the second plurality of teeth 2, 3 and the plurality of triangular points. This arrangement causes narrow gaps to form between the first and second pluralities of teeth and the first plurality of teeth and the triangular points when the top structure 1 rotates within the bottom structure 7 with the first and second grinding chambers facing each other and coupled together. Rotating the top structure 1 in this configuration forces larger chucks of natural material inside the first and second grinding chambers thereby shedding and grinding the natural material into mulch or fine particulate.

Figure 2:
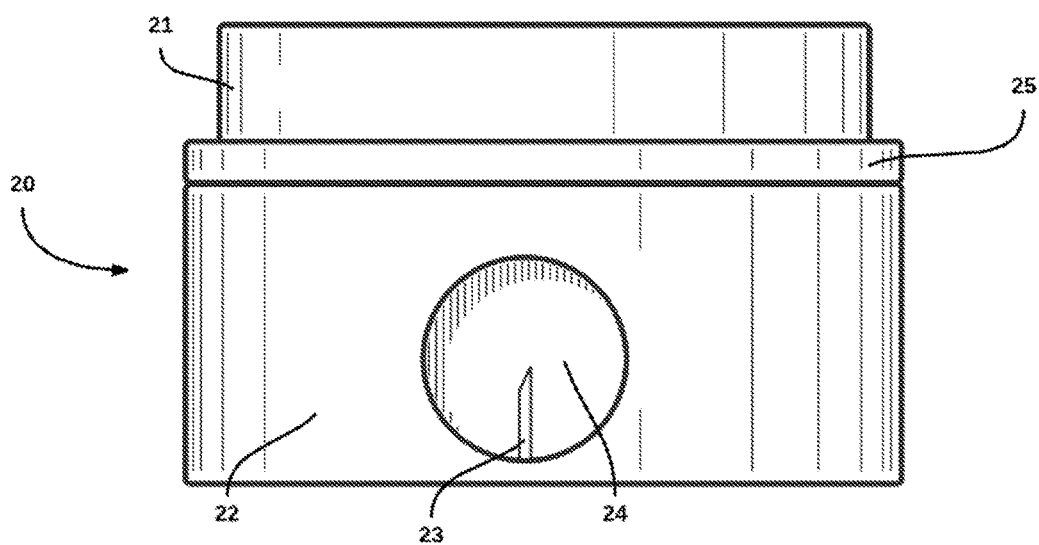
FIG. 2 illustrates a side view of a two-piece embodiment of the cutting and grinding device.

The bottom section 7 further comprises a base 8 mounted to the underside of the upper grinding section. The upper surface of the base comprises the shelf 12 immediately below the recessed outer wall 11 of the upper grinding section. In one embodiment, the cutting chamber 10 is positioned toward the center of the base with a blade 9 in the lower middle portion of the cutting chamber 10. FIG. 2 illustrates a side view of a bottom structure 20 with a cylindrical cutting chamber 24 and a blade 23 molded into the middle of the lower portion of the base 22. In this example, the cutting chamber has two open ends allowing materials to slide through the full circumference of the cylindrical base 22.

In addition to the two-piece variation shown in FIGS. 1-2, three-piece variations of the cutting and grinding device also exist wherein the base 8 decouples from the upper cutting section by pulling or rotating the base 8 and holding the cutting section in place. In one three-piece embodiment, the base 8 decouples from the upper grinding section just below the shelf 12. This orientation allows the top structure 1 to sit on the shelf 12 when coupled to the upper grinding section even when the base 8 is removed.

Figure 4:
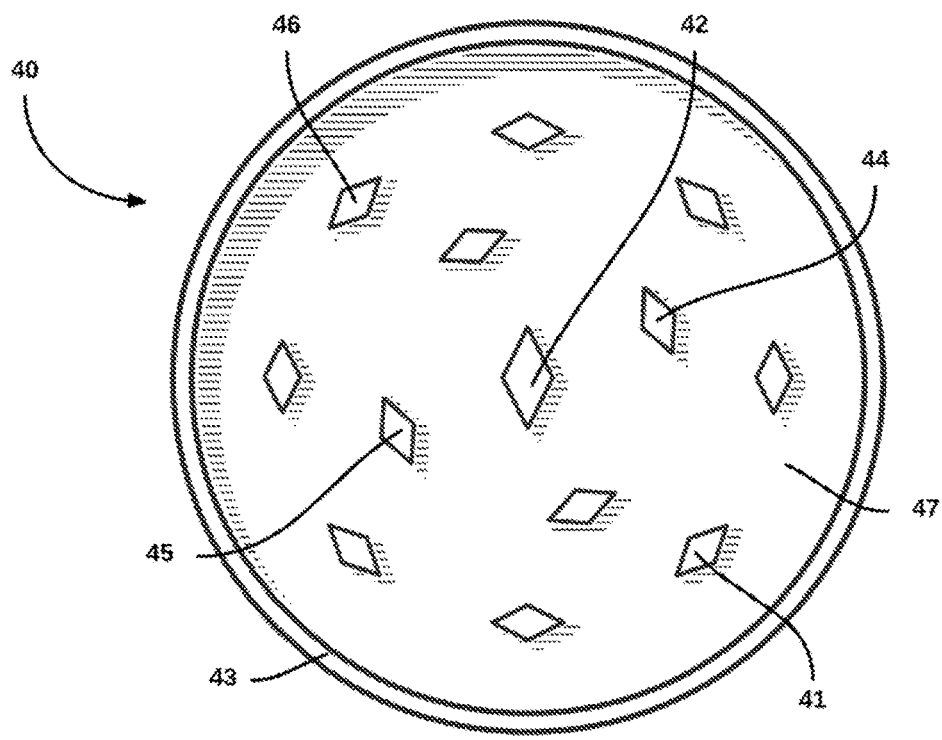
FIG. 4 illustrates a bottom view of the top structure in one embodiment of the cutting and grinding device.

FIG. 4 illustrates one example pattern for the first plurality of teeth on the underside of the top structure 40. In this example, the first plurality of teeth are arranged in a concentric circle pattern comprising two concentric rings of teeth. Both concentric rings surround an enlarged central tooth 42. Additionally, teeth in the inner and outer concentric rings 44, 41 are rotated thirty to ninety degrees counterclockwise from the central tooth's vertical axis. The degree of rotation is also kept constant for teeth on opposite sides of the central tooth. For example, in the inner concentric ring, tooth 44 has the same degree of rotation as tooth 45. Similarly, in the outer concentric ring, the degree of rotation for tooth 41 matches the degree of rotation for tooth 46 on the opposite side of the central tooth 42. The first plurality of teeth are contained within a first grinding chamber 47 defined by an outer wall 43.

Figure 5:
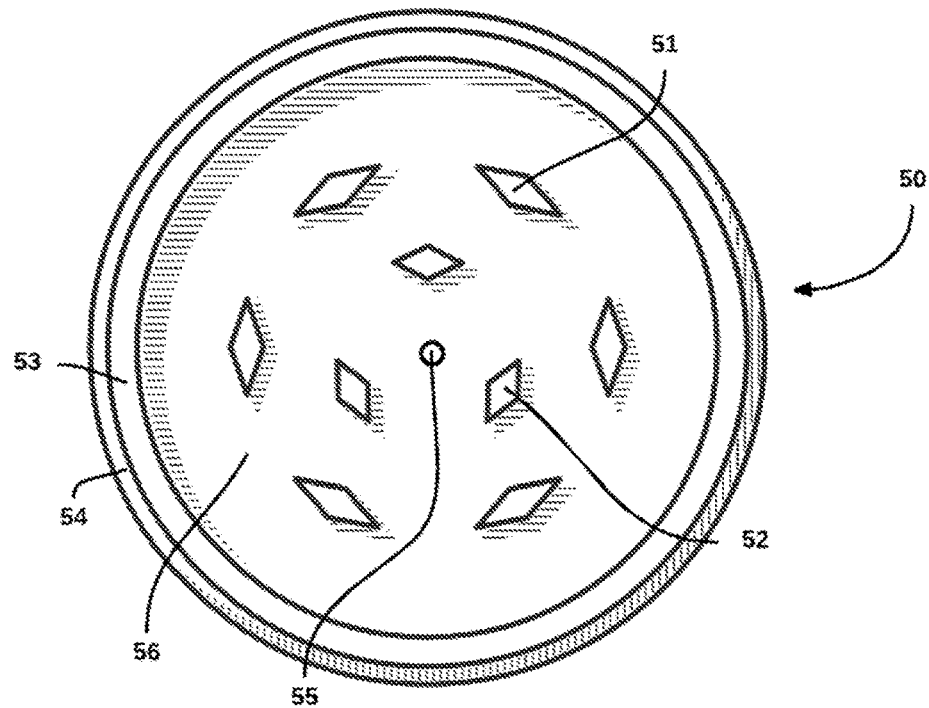
FIG. 5 illustrates a top view of the grinding structure in one embodiment of the cutting and grinding device.

FIG. 5 illustrates one example pattern for a second plurality of teeth on the top side of the bottom structure 50. In this example, the second plurality of teeth are arranged in a concentric circle pattern comprising two concentric rings of teeth with smaller teeth in the inner concentric ring 52 and larger teeth in the outer concentric ring 51. Teeth in the inner and outer concentric rings are rotated thirty to ninety degrees counterclockwise from the vertical axis passing through the center of the inner concentric ring 55. The degree of rotation for teeth on opposite sides of the outer concentric ring is kept constant. Identical degrees of rotation for opposite teeth in the outer concentric ring of the second plurality of teeth and both concentric rings in the first plurality of teeth maintains a narrow gap between teeth at every degree of rotation for the top structure 40 within the bottom structure 50. The second plurality of teeth is contained within a second grinding chamber 56 defined by a recessed outer wall 53. From the top view in FIG. 5, the shelf 54 of the bottom structure 50 is visible just beyond the outer surface of the recessed outer wall 53.

Figure 6:
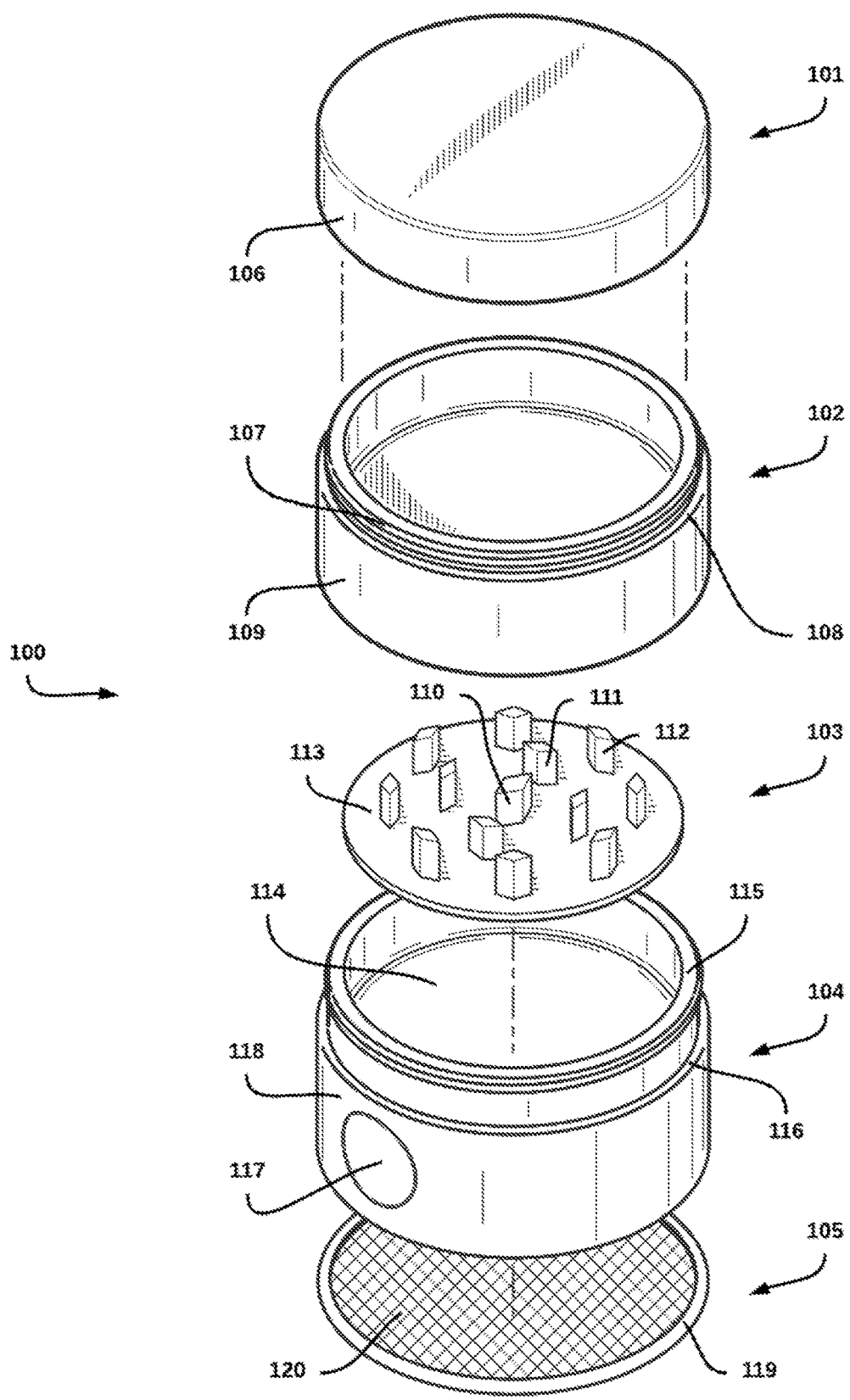
FIG. 6 illustrates an upper exploded view of a four-piece embodiment of the cutting and grinding device.

FIG. 6 illustrates an upper exploded view of a four piece embodiment 100 of the cutting and grinding device described herein. The four-piece example includes a top structure 101, a grinding structure 102 containing a second plurality of teeth 103, a collection and cutting structure 104, and a fine collection structure 105. The top structure 101 includes a first plurality of teeth (not visible from this perspective) extending out from the underside of the top structure 101. The first plurality of teeth are contained within a first grinding chamber defined by an outer wall 106.

The top structure 101 rotatably couples to the grinding structure 102 by fitting over and around a recessed outer wall 107 on the upper section of the grinding structure 102. Additionally, when coupled to the grinding structure 102, the bottom edge of the top structure outer wall 106 sits on a shelf 108 just below the recessed outer wall 107. The shelf 108 helps stabilize the top structure 101 inside the grinding structure 102 and ensures the first plurality of teeth rotates evenly through material in the grinding chamber when the top structure 101 is rotated. A second plurality of teeth 103 mounts to the grinding structure 102 inside the recessed outer wall 107 creating a second grinding chamber in the upper portion of the grinding structure 102. Teeth in the inner and outer rings are rotated thirty to ninety degrees counterclockwise from the vertical axis of the central tooth 110. Optionally, the top surface of the enlarged central tooth 110 comprises a magnet that couples to a corresponding magnet of opposite polarity mounted to the underside of the top structure 101. When the top structure 101 couples to the grinding structure 102, the magnetic force between the pair of magnets creates a magnetic bond between the top and grinding structures 101, 102. This magnetic bond stabilizes the top structure 101 inside the grinding structure 102 and ensures the top structure 101 will not decouple from the grinding structure 102 when rotated to grind natural materials inside the grinding chamber.

The first plurality of teeth extending out from the underside of the top structure 101 is arranged in a concentric circle pattern that is compatible with the second plurality of teeth 103. In this example, the first plurality of teeth are arranged in two concentric rings that fit between the two concentric rings of the second plurality of teeth 103. Specifically, the inner ring of the first plurality of teeth sits between the central tooth 110 and the inner concentric ring 111 of the second plurality of teeth 103 and the outer concentric ring of the first plurality of teeth sits between the inner and outer concentric rings of the second plurality of teeth 103.

In other four-piece examples, the central tooth is part of the first plurality of teeth extending out from the underside of the top structure and a plurality of triangular points extend out from the inner surface of the recessed outer wall 107. In this arrangement, when the top and grinding structures 101, 102 are joined with the first and second grinding chambers facing each other forming the grinding chamber, the inner concentric ring of the second plurality of teeth sits between the central tooth and the inner concentric ring of the first plurality of teeth, the outer concentric ring of the second plurality of teeth sits between the inner and outer rings of the first plurality of teeth, and the outer ring of the first plurality of teeth sits between the outer ring of the second plurality of teeth and triangular points extending out from the inner surface of the outer recessed wall 107. Additionally, in other four-piece examples, the floor surface 113 of the second plurality of teeth 103 may have one or more holes in the space between the teeth. After grinding, these holes allow small bits of ground material to fall through the floor surface 113 into the collection section 114 of the collection and cutting structure 104.

The specific teeth and teeth patterns described herein are for illustrative purposes only. One skilled in the art will readily recognize from the preceding discussion that embodiments comprising alternative teeth structures and patterns may be employed without departing from the principles of the invention described herein. Specifically, variations in tooth shape, tooth size, tooth number, tooth degree of rotation, and tooth depth as well as variations in the arrangement and orientation of at least one of the first plurality of teeth, the second plurality of teeth, or both are included within the scope of this invention.

The grinding structure 102 removably couples to the collection and cutting structure 104 by fitting over and around the recessed outer wall 115 of the collection and cutting structure 104. When coupled to the collection and cutting structure 104, the bottom surface of the lower outer most wall 109 of the grinding structure 102 sits on top of a shelf 116 just below the recessed outer wall 115 of the collection and cutting structure 104. The shelf 116 helps stabilize the grinding structure 102 on top of the collection and cutting structure 104. The upper collection portion 114 of the collection and cutting structure 104 comprises a collection chamber for collecting mulch and fine particulate produced by grinding natural materials in the grinding chamber. The lower collection chamber is defined by a recessed outer wall 115 and is immediately above the cutting section of the collection and cutting structure 104. Optionally, the floor surface of the collection portion 114 comprises a fine wire mesh screen that allows powder and finer dust particles of ground materials to pass through the collection and cutting structure 104 into the fine collection structure 105.

The lower cutting section of the collection and cutting structure 104 comprises a cylindrical base 118 with a cutting chamber 117 in the center. In this example, the cutting chamber includes two openings, one on each opposite side of the base 118 and a blade in the middle of the bottom portion of the cutting chamber 117. Natural materials are cut using the lower cutting section by sliding the material into the cutting chamber 117 through one opening, pulling the material through the blade and removing the material from the opening on the opposite side of the base 118. In one example, the blade is removably attached to a slot in the lower or upper middle section of the cutting chamber. In these examples, the blade can be moved or replaced by detaching it from the slot and placing a new or old blade in the same or different slot.

In examples with removable blades, the slot may have one or more pegs and/or rotatable clasps for securing the blade within the slot. In one embodiment, the area of the base beneath the blade is hollow so that the underside of the slot is accessible. To remove the blade from the slot, a clasp covering the lower portion of the blade that is disposed in the slot is rotated through the underside of the slot into the hollow base area. The blade is then removed from one or more pegs extending away from at least one side wall of the slot. The unimpaled blade is then extracted from the slot through either the top or underside. In one embodiment the underside of the base is removable by rotating or sliding. In other examples, the underside of the base is left open with the hollow base area beneath the blade exposed.

The cutting and grinding structure 104 removably couples to the fine collection structure 105 by fitting the bottom portion of the outer wall of the base 118 over the top surface of the outer wall 119 of the fine collection structure 105. The fine collection structure comprises a fine collection chamber 120 for collecting powder and fine dust particles that pass through the fine wire mesh floor of the collection and cutting chamber. In some examples, the floor surface of the fine collection chamber 120 is textured in a variable pattern. This texturing provides an uneven surface on the floor of the fine collection chamber 120 to assist with extracting powder and fine dust particles of the ground natural material from the floor surface of the fine collection chamber 120.

In one four-piece embodiment, the fine collection structure 105 is located above the cutting section and directly beneath the collection section of the collection and cutting structure 104. This arrangement allows powder and dust particles of the ground natural material to pass directly from the collection chamber 114 into the fine collection structure 105 without passing through the cutting section of the collection and cutting structure 104. In this embodiment, the underside of the base 118 of the cutting section is the bottom surface of the four-piece grinder and cutting device.

We claim:

1. A grinding and cutting device comprising:
    a top structure comprising a top surface, a first grinding chamber defined by a side wall, a first plurality of teeth for grinding materials, the first plurality of teeth extending out from the underside of the top surface within the first grinding chamber;
    a bottom structure rotatably coupled to the top structure, the bottom structure comprising a second grinding chamber facing the first grinding chamber, the second grinding chamber defined by a recessed outer wall and a floor surface, the bottom structure further comprising a second plurality of teeth extending out from the top side of the floor surface of the second grinding chamber, and a cutting base including a shelf and a cutting chamber comprising a blade, and at least one opening a first opening on a near side of the cutting base opposite a second opening on a rear side of the cutting base,
    enabling a material to be cut by sliding the material into the cutting chamber through the first opening, pulling the material through the blade, and removing the material from the second opening; and
    at least one first magnet mounted to the underside of at least one tooth in the first plurality of teeth and at least one second magnet mounted to the topside of the floor surface in between the second plurality of teeth.

2. The grinding and cutting device of claim 1, wherein the location and polarity of the first magnet matches up with the location and polarity of the second magnet causing the first magnet to associate with the second magnet, wherein the association between the first magnet and the second magnet provides a magnetic force for securing the first grinding chamber to the second grinding chamber.

3. The cutting and grinding device of claim 1, wherein the first plurality of teeth are arranged in a concentric ring pattern comprising two concentric rings surrounding an enlarged central tooth.

4. The cutting and grinding device of claim 3, wherein the second plurality of teeth are arranged in a concentric ring pattern comprising two concentric rings surrounding an open space.

5. The cutting and grinding device of claim 4, wherein the concentric ring pattern of the first plurality of teeth is compatible with the concentric ring pattern of the second plurality of teeth, wherein the compatibility of the concentric ring pattern ensures narrow gaps are maintained between teeth for every degree of rotation of the top structure within the bottom structure.

6. The cutting and grinding device of claim 1, wherein the shelf holds the top structure in place over the bottom structure by providing a surface for the side wall to sit on when the top structure is coupled to the bottom structure with the first and second grinding chambers facing each other.

7. The cutting and grinding device of claim 1, wherein the blade is located in the lower middle portion of the cutting chamber.

8. The cutting and grinding device of claim 7, wherein the blade is set back some distance from the opening of the cutting chamber so that only objects inserted into the cutting chamber interact with the blade.

9. A cutting and grinding device comprising:
a top structure comprising a top surface, a first grinding chamber defined by a side wall, a first plurality of teeth extending out from the underside of the top surface within the first grinding chamber;
a grinding structure rotatably coupled to the top structure, the grinding structure comprising a second grinding chamber facing the first grinding chamber, the second grinding chamber defined by a recessed outer wall and a floor surface, the grinding structure further comprising a second plurality of teeth extending out from the top side of the floor surface of the second grinding chamber, the floor surface having a least one hole allowing ground mulch to travel through the grinding structure;
a collection and cutting structure coupled to the grinding structure, the collection and cutting structure comprising a collection portion and a cutting portion, the collection portion comprising a collection chamber defined by a recessed outer wall and a permeable floor surface, and the cutting portion comprising a cutting base including a cutting chamber and a blade, the cutting portion further comprising a shelf positioned on the top surface of the outer wall of the cutting base, a first opening on a near side of the cutting base opposite a second opening on a rear side of the cutting base, enabling a material to be cut by sliding the material into the cutting chamber through the first opening, pulling the material through the blade, and removing the material from the second opening; and
a fine collection structure coupled to the collection and cutting structure, the fine collection structure comprising a fine collection chamber having a floor surface.

10. The cutting and grinding device of claim 9, wherein the permeable floor surface is a narrow wire mesh that allows powder and dust particles to pass through the collection and cutting structure.

11. The cutting and grinding device of claim 9, wherein the floor surface of the fine collection chamber comprises a textured surface for assisting with extraction of powder and dust particles from the collection chamber.

12. A grinding and cutting device comprising,
a top structure comprising a top surface, a first grinding chamber defined by a side wall, a first plurality of teeth extending out from the underside of the top surface within the first grinding chamber;
a grinding structure rotatably coupled to the top structure, the grinding structure comprising a second grinding chamber facing the first grinding chamber, the second grinding chamber defined by a recessed outer wall and a floor surface, the grinding structure further comprising a second plurality of teeth extending out from the top side of the floor surface of the second grinding chamber, the floor surface having a least one hole allowing ground mulch to travel through the grinding structure;
a collection and cutting structure coupled to the grinding structure, the collection and cutting structure comprising a collection portion, a fine collection portion, and a cutting portion, the collection portion comprising a collection chamber defined by a recessed outer wall and a permeable floor surface, the fine collection portion positioned immediately below the collection portion, the fine collection portion comprising a fine collection chamber, and the cutting portion positioned immediately above the fine collection portion, the cutting portion comprising a cutting base including a cutting chamber and a blade, the cutting portion further comprising a shelf positioned on the top surface of the outer wall of the cutting base; and
wherein the shelf helps stabilize the grinding structure on top of the collection and cutting structure.

13. The cutting and grinding device of claim 12, wherein the permeable floor surface is a narrow wire mesh that allows powder and dust particles to pass through the collection and cutting structure into the fine collection chamber.

14. The cutting and grinding device of claim 12, wherein the floor surface of the fine collection chamber comprises a textured surface for assisting with extraction of powder and dust particles from the collection chamber easier.

15. The cutting and grinding device of claim 12, wherein the blade is set back some distance from the opening of the cutting chamber so that only objects inserted into the cutting chamber interact with the blade.

16. The cutting and grinding device of claim 12, wherein the cutting chamber comprises one opening on a near side of the base opposite a second opening on a rear side of the base.

* * * * *